United States Patent [19]

Gerkin et al.

[11] Patent Number: 4,954,560
[45] Date of Patent: Sep. 4, 1990

[54] STABLE POLYMER/POLYOLS MADE WITHOUT MACROMONOMER

[75] Inventors: Richard M. Gerkin; Michael W. Jorgenson, both of Cross Lanes, W. Va.; Paul W. Leuzzi, II, New Milford, Conn.

[73] Assignee: Union Carbide Chemicals and Plastics Company Inc., Danbury, Conn.

[21] Appl. No.: 373,923

[22] Filed: Jun. 30, 1989

[51] Int. Cl.$^5$ ............................................. C08L 75/04
[52] U.S. Cl. ................................... 524/714; 524/724; 525/185
[58] Field of Search ................. 524/714, 724; 525/185

[56] References Cited

U.S. PATENT DOCUMENTS

| | | | |
|---|---|---|---|
| 4,148,840 | 4/1979 | Shah | 260/859 |
| 4,208,314 | 6/1980 | Priest et al. | 260/33.2 |
| 4,390,645 | 6/1983 | Hoffman et al. | 521/137 |
| 4,454,255 | 6/1984 | Ramlow et al. | 521/137 |
| 4,458,038 | 3/1984 | Ramlow et al. | 521/137 |
| 4,460,715 | 7/1984 | Hoffman et al. | 521/137 |
| 4,522,976 | 6/1985 | Grace et al. | 524/722 |
| 4,550,194 | 10/1985 | Reichel et al. | 560/200 |
| 4,652,589 | 3/1987 | Simroth et al. | 521/137 |
| 4,661,531 | 4/1987 | Davis et al. | 521/137 |
| 4,689,354 | 8/1987 | Ramlow et al. | 521/137 |
| 4,690,956 | 9/1987 | Ramlow et al. | 521/137 |

*Primary Examiner*—Maurice J. Welsh
*Attorney, Agent, or Firm*—Paul W. Leuzzi

[57] ABSTRACT

A stable polymer polyol made by the in situ polymerization of two or more monomers in a polyol blend wherein at least one monomer is a bifunctional compound containing both an isocyanate group and an ethylinically unsaturated group and wherein the polyol blend contains a base polyol and an amine terminated polyether which is more reactive with the bifunctional compound than is the base polyol.

11 Claims, No Drawings

STABLE POLYMER/POLYOLS MADE WITHOUT MACROMONOMER

BACKGROUND OF THE INVENTION

1. Field of the Invention

The present invention relates to stable polymer polyols produced without the use of a preformed macromonomer stabilizer. In particular, the instant invention relates to the in situ polymerization of two or more monomers in a polyol blend wherein at least one monomer is a bifunctional isocyanate compound containing both an isocyanate group and an ethylenically unsaturated group and wherein the polyol blend contains a base polyol and an amine terminated polyether which is more reactive with the bifunctional isocyanate compound than is the base polyol.

2. Description of the Prior Art

Polymer/polyol compositions suitable for use in producing polyurethane foams, elastomers and the like are known materials. The basic patents in the field are Stamberger U.S. Pat. No. Re. 28,715 (reissue of U.S. Pat. No. 3,383,351) and U.S. Pat. No. Re. 29,118 (reissue of U.S. Pat. No. 3,304,273). Such compositions can be produced by polymerizing one or more ethylenically unsaturated monomers dissolved or dispersed in a polyol in the presence of a free radical catalyst to form a stable dispersion of polymer particles in the polyol. These polymer/polyol compositions have the valuable property of imparting to polyurethane foams and elastomers produced therefrom higher load-bearing properties than are provided by the corresponding unmodified polyols.

The polymer/polyol compositions that found initial commercial acceptance were primarily compositions produced using acrylonitrile. Many of these compositions were somewhat higher in viscosity than desired in some applications. More recently, polymer/polyol compositions produced from acrylonitrile-styrene monomer mixtures have been used commercially.

Polyurethane foams made with polymer/polyols are widely utilized. The two major types of foam are generally termed slabstock and molded. More particularly, slabstock foams employing polymer/polyol compositions are used in the carpet, furniture and bedding industries. One primary use of slabstock foam is as carpet underlay.

In the molded foam area, the primary type of foam employed is generally termed high resiliency (HR) molded foam. HR molded foams have been widely used in the automotive industry for applications ranging from molded seats to energy-absorbing padding and the like.

The wide demand for polymer/polyols has spawned a number of trends that have created the need for additional technology. For example, the general trend is to provide slabstock foams that are virtually scorch-free, i.e., white foam products. Indeed, the desire is to provide techniques capable of producing, without substantial economic penalty, virtually scorch-free foams at ever-decreasing densities (viz. 1.5 pounds per cubic foot or less) while maintaining satisfactory load-bearing and other foam properties.

Such scorch-free foams have been obtained by utilizing relatively high styrene contents (e.g. - about 65 to 70 percent styrene) in the acrylonitrile styrene monomer mixture. The utilization of such high styrene monomer mixtures in the molded foam area is also widespread.

The preparation of polymer/polyols from such high styrene monomer mixtures has created difficulties. More particularly, such difficulties arise due to the state of the art to which polyurethane production has now advanced, such as the degree of the stability of polymer/polyol compositions. Many applications require somewhat rigorous stability characteristics, and such characteristics become more difficult to achieve when high styrene monomer mixtures are employed.

A further trend is the desire to provide foams with ever increasing load-bearing characteristics for many applications. This is particularly prevalent in the slabstock area where many formulations require the use of "neat" polymer/polyols, i.e., the polymer/polyol is employed without dilution with conventional polyols. While typically not used neat in the molded foam area, polymer/polyols capable of imparting higher and higher load-bearing characteristics to such foams are likewise desired.

Such increased load-bearing characteristics are being obtained by increasing the polymer or solids content of the polymer/polyol. Solids contents of 35 to 50 weight percent or even more are accordingly desired. Preparing such high solids content polymer/polyols with the degree of stability often desired becomes substantially more difficult as the solids content is increased.

The trend toward the use of high styrene monomer mixtures and high solids content polymer/polyols has likewise resulted in polymer/polyols sometimes having higher than desired viscosities. The viscosity of a polymer/polyol must, of course, be sufficiently low to allow ease in handling during manufacture. Moreover, the viscosity must allow ready transport, handling and, ultimately, adequate processability in the foam processing equipment being utilized. The viscosity level is becoming of acute concern in the molded area due to the sophisticated mixing systems, such as impingement systems, that are increasingly being utilized. There is a clear need to provide the desired polymer/polyols with as low a viscosity as possible.

Also, the degree of stability of the polymer/polyol, as alluded to previously, is of concern. At one time, there was not much concern for the seediness or filterability of polymer/polyols in actual commercial practice. However, the state of the art of polyurethane production has now advanced to the point where these considerations are very important in many applications. This is particularly important in the molded foam area.

Thus, the development of sophisticated, high speed and large volume equipment, machines and systems for handling, mixing and reacting polyurethane-forming ingredients has created the need for highly stable and low viscosity polymer/polyols. Polymer/polyols must accordingly meet certain minimum requirements in order to be capable of being satisfactorily processed in the sophisticated foam equipment now used. Typically, the prime requirement is that the polymer/polyols possess sufficiently small particles so that filters, pumps and the like do not become plugged or fouled in relatively short periods of time.

Since the basic development by Stamberger, a substantial amount of effort has been devoted to providing improved polymer/polyols and to improved preparation techniques. For example, U.S. Pat. No. 4,208,314 to Priest et al. discloses low viscosity polymer/polyols made from acrylonitrile-styrene monomer mixtures.

These polymer/polyols can be converted to low density, water-blown polyurethane foams having reduced scorch, especially when the acrylonitrile to-styrene ratio is relatively low. The Priest et al. patent also provides a process for making polymer/polyols whereby the particulate nature of the polymer portion of the product is considerably improved, compared to polymer/polyols prepared by prior processes. The improved process provided by Priest et al. includes, in general, maintaining a low monomer to polyol concentration throughout the reaction mixture during the polymerization.

A further improvement in the formation of polymer/polyols is provided by U.S. Pat. No. 4,148,840 to Shah. This discloses a process for producing highly stable and filterable polymer/polyol compositions by polymerizing the monomer or monomers in situ in a polyol mixture that includes a minor amount of preformed polymer/polyol.

It has been recognized that the stability of polymer/polyols requires the presence of a minor amount of a graft or addition copolymer which is formed in situ from growing polymer chains and polyol molecules. Some prior approaches have thus been directed to incorporation of small amounts of unsaturation into the polyol in addition to that inherently present in the polyoxyalkylene polyols typically used in forming polymer/polyols in the belief that improved stability will result due to an increased amount of an addition copolymer stabilizer expected to be formed. U.S. Pat. Nos. 3,652,639, 3,823,201, and 3,850,861, British Patent No. 1,126,025 and Japanese Patent Nos. 52-80919 and 48,101494 all utilize this approach.

In a similar vein, the use of what may be termed "stabilizer precursors" has been proposed. More specifically, the concept is to carry out the preparation of the polymer/polyol in the presence of a suitable amount of the stabilizer precursor, which precursor comprises what has been termed a "macromer" that contains a particular level of reactive unsaturation. The belief is that, during polymerization in the preparation of the polymer/polyol, adequate amounts of stabilizer will be formed by the addition polymerization of the precursor stabilizer with a growing polymer chain. The concept of using stabilizer precursors in polymerization is a well-recognized and old technique as discussed in "Dispersion Polymerization in Organic Media", edited by K. E. J. Barrett, John Wiley & Sons, copyright 1975. U.S. Pat. Nos. 4,454,255 and 4,458,038 are recent examples utilizing this technique. The macromer in the '255 and '038 patents may be obtained by reacting a polyol with a compound having reactive ethylenic unsaturation such as, for example, maleic anhydride or fumaric acid. A further example of the use of this technique is U.S. Pat. No. 4,460,715. The reactive unsaturation in the '715 stabilizer is provided by an acrylate or methacrylate moiety.

More recently, U.S. Pat. No. 4,550,194 disclosed a polyol which is alleged to find utility as a precursor in the preparation of graft polymer dispersions although no specific mention of its use to prepare a stabilizer is made. This polyol is prepared by reacting a conventional polyether polyol with an organic compound having ethylenic unsaturation and an anhydride group forming a half ester and subsequently reacting that product with alkylene oxide in the presence of calcium naphthenate or cobalt naphthenate. In particular, see example 51 of this patent where pentaerythritol is used.

In U.S. Pat. No. 4,652,589, stabilizer precursors are taught for polymer/polyols. In particular, Stabilizers A and B utilized polyols with added unsaturation.

In addition, U.S. Pat. No. 4,390,645 discloses a stabilizer made from a polyanl and isocyantoethylmethacrylate.

OBJECTS OF THE INVENTION

The primary object of the present invention is to provide stable polymer/polyols having high polymer contents with low viscosities without the use of a preformed macromonomer.

Another object of the present invention is to prepare a urethane foam that is characterized as having open cells and whose formulation is stable during its formation so as to avoid foam collapse.

Other objects of this invention will be apparent from the description and examples set forth hereinafter.

SUMMARY OF THE INVENTION

This invention provides a process for the manufacture of stable polymer/polyols having high polymer contents without the use of preformed macromonomers by the in situ polymerization of two or more monomers in a polyol blend wherein at least one monomer is a bifunctional isocyanate containing both an isocyanate group and and ethylenically unsaturated group and wherein the polyol blend contains a base polyol and an amine terminated polyether which is more reactive with the bifunctional isocyanate compound than is the base polyol. The invention also provides for the polymer/polyols so made and for their use in the manufacture of polyurethane foams.

DETAILED DESCRIPTION OF THE INVENTION

The exact composition of the polyol blend depends upon the end use of the polyurethane product to be produced. It must include at least one polyhydroxy material (base polyol) and one polyether intermediate capable of reacting with the bifunctional isocyanate compound at a rate faster than the rate the base polyol would react with the bifunctional compound, such as an amine terminated polyol.

Base Polyol

The molecular weight or hydroxyl number of the base polyol may thus be selected so as to result in flexible, semi-flexible, or rigid foams or elastomers when the polymer/polyol produced from the base polyol is converted to a polyurethane. The hydroxyl number of the polyol or polyols employed can accordingly vary over a wide range. In general, the hydroxyl number of the polyols employed may range from about 20 (or lower) to about 150 (and higher).

For example, when foams are to be prepared, the molecular weight or the hydroxyl number may be selected to result in flexible, semi-flexible, or rigid foams. The polyols in this instance preferably possess a hydroxyl number of at least 150 for rigid foams, from about 50 to about 150 for semi-flexible foams, and from about 20 to about 70 for flexible foams. As a further refinement, the specific foam application will likewise influence the choice of base polyol. As an example, for molded foam, the hydroxyl number of the base polyol may be on the order of about 20 to about 40, and for slabstock the hydroxyl number may be on the order of about 25 to about 70.

As a further example, for elastomer applications, it will generally be desirable to utilize relatively high molecular weight base polyols having relatively low hydroxyl numbers, e.g., 20 to 50 or so.

The hydroxyl number limits described above are not intended to be restrictive, but are merely illustrative of the large number of possible combinations for the polyol or polyols used.

The hydroxyl number is defined as the number of milligrams of potassium hydroxide required for the complete hydrolysis of the fully phthalated derivative prepared from one gram of polyol. The hydroxyl number can also be defined by the equation:

$$OH = (56.1 \times 1000 \times f)/m.w.$$

where

OH = hydroxyl number of the polyol
f = functionality, that is, average number of hydroxyl groups per molecule of polyol
m.w. = number average molecular weight of the polyol.

Substantially any of the polyols previously used in the art to make polymer/polyols can be used as the base polyol in this invention. Illustrative of the polyols useful in producing polymer/polyol compositions in accordance with this invention are the polyhydroxyalkanes, the polyoxyalkylene polyols, or the like. Among the polyols which can be employed are those selected from one or more of the following classes of compositions, alone or in admixture, known to those skilled in the polyurethane art:

(a) alkylene oxide adducts of polyhydroxyalkanes;
(b) alkylene oxide adducts of nonreducing sugars and sugar derivatives;
(c) alkylene oxide adducts of phosphorus and polyphosphorus acids;
(d) alkylene oxide adducts of polyphenols;
(e) the polyols from natural oils such as castor oil, and the like.

Illustrative alkylene oxide adducts of polyhydroxyalkanes include, among others, the alkylene oxide adducts of ethylene glycol, propylene glycol, 1,3-dihydroxypropane, 1,3-dihydroxybutane, 1,4-dihydroxybutane, 1,4-, 1,5- and 1,6-dihydroxyhexane, 1,2-, 1,3 1,4-, 1,6-, and 1,8-dihydroxyoctane, 1,10-dihydroxydecane, glycerol, 1,2,4-trihydroxybutane, 1,2,6-trihydroxyhexane, 1,1,1 trimethylolethane, 1,1,1-trimethylolpropane, pentaerythritol, caprolactone, polycaprolactone, xylitol, arabitol, sorbitol, mannitol, and the like.

A further class of polyols which can be employed are the alkylene oxide adducts of the nonreducing sugars, wherein the alkylene oxides have from 2 to 4 carbon atoms. Among the nonreducing sugars and sugar derivatives contemplated are sucrose, alkyl glycosides such as methyl glucoside, ethyl glucoside, and the like, glycol glycosides such as ethylene glycol glucoside, propylene glycol glycoside, glycerol glucoside, 1,2,6-hexanetriol glucoside, and the like, as well as the alkylene oxide adducts of the alkyl glycosides as set forth in U.S. Pat. No. 3,073,788.

A still further useful class of polyols is the polyphenols, and preferably the alkylene oxide adducts thereof wherein the alkylene oxides have from 2 to 4 carbon atoms. Among the polyphenols which are contemplated are, for example, bisphenol A, bisphenol F, condensation productions of phenol and formaldehyde, and novolac resins; condensation products of various phenolic compounds and acrolein; the simplest member of this class being 1,2,3-tris(hydroxyphenyl) propanes, condensation products of various phenolic compounds and glyoxal, glutaraldehyde, and other dialdehydes, the simplest members of this class being the 1,1,2,2-tetrakis (hydroxyphenol) ethanes, and the like.

The alkylene oxide adducts of phosphorus and polyphosphorus acids are another useful class of polyols. Ethylene oxide, 1,2-epoxypropane, the epoxybutanes, 3-chloro-1,2-epoxypropane, and the like are preferred alkylene oxides. Phosphoric acid, phosphorus acid, the polyphosphoric acids such as tripolyphosphoric acid, the polymetaphosphoric acids, and the like are desirable for use in this connection.

The most preferred base polyols employed in this invention include the poly(oxypropylene) glycols, triols, and higher functionality polyols, and the like that are capped with ethylene or propylene oxide as dictated by the reactivity requirements of the particular polyurethane application. Generally, the nominal functionality of such polyols will be in the range of about 3 to 4 or so. These polyols also include poly (oxypropyleneoxyethylene) polyols; however, desirably, the oxyethylene content should comprise less than 80 percent of the total and preferably less than 60 percent. The ethylene oxide, when used, can be incorporated in any fashion along the polymer chain. Stated another way, the ethylene oxide can be incorporated either in internal blocks, as terminal blocks, or may be randomly distributed along the polyol chain.

As is well known in the art, the polyols that are most preferred herein contain varying small amounts of unsaturation. Unsaturation in itself does not affect in any adverse way the formation of the polymer/polyols in accordance with the present invention except in the case where the extent or type of unsaturation is so high as to result in a highly crosslinked polymer/polyol or gel.

Polyether Intermediate

The polyol blend must contain an effective amount of an amine terminated polyether which has a higher reactivity rate with the bifunctional isocyanate compound than does the base polyol and which has a molecular weight approximately equal to or greater than the molecular weight of the base polyol. Preferably an amine terminated polyether with higher molecular weights are employed. These can be prepared from suitably reactive materials with a molecular weight greater than about 6000. Typically, high molecular weight polyalkylene oxides are used to provide the polymer backbone. The preferred materials are the polyoxyalkylene oxides obtained from polymerization of propylene oxide and optionally ethylene oxide using a suitable "starter" and potassium hydroxide catalyst. Preferrably, the polymer intermediate has a molecular weight of about 12,000 and its functionality is 6. It is believed that a useful functionality range is between 2 and 6 provided that the molecular weight is kept to the right level. The amine terminated polyether must contain functional groups which are more reactive with the bireactive compound than are the functional groups on the base polyol.

The effective amount of the amine terminated polyether in the polyol blend generally is in the range of from 1 to 25 weight percent, based on the total weight of the polyol blend, preferably 3 to 10 weight percent. In addition, a minimum amine content of about 0.1 meq/grams is considered necessary.

Preferably the amine terminated polyether is of the general formula:

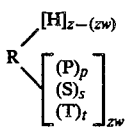

wherein:

R represents an initiator radical based on a compound containing Zerewitinoff active hydrogen atoms;

H represents a hydroxy-containing group of the formula:

P represents a primary amine-containing group of the formula:

S represents a secondary amine containing group of the formula:

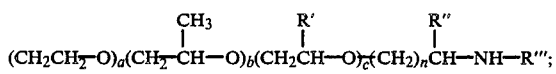

T represents a tertiary amine-containing group of the formula:

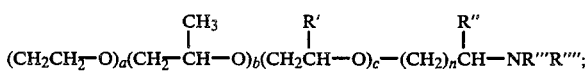

a is 0 to 175;
b is 0 to 175;
c is 0 to 30;
n is 1 to 3;
the sum a+b+c must be greater than or equal to 2 when n equals 1;
R' is an alkyl group containing from two carbon atoms to eighteen carbon atoms;
R" is hydrogen or an alkyl group containing up to eighteen carbon atoms;
R'" and R"" are independently alkyl groups containing from two to twelve carbon atoms;
p is a mole fraction of the aminated portion of the amine terminated polyether and is from 0 to less than 0.75;
s is a mole fraction of the aminated portion of the amine terminated polyether and is from 0.25 to 1.0;
t is a mole fraction of the aminated portion of the amine terminated polyether and is from 0 to 0.15;
w is the percent amination of the zerwitinoff active hydrogen on the intermediate compound; generally 20 percent to 100 percent, and preferably 70 percent or more.
(zw) is the product of z and w;
p+s+t=1; and
z is an integer derived from the number of Zerewitinoff active hydrogens on the initiator.

The preparation of such amine terminated polyethers is disclosed in U.S. patent application Ser. No. 176,217 filed Mar. 31, 1988.

Monomer Mixture

The monomer mixture must contain at least one bifunctional isocyanate compound containing both an isocyanate group and an ethylenically unsaturated group. The bifunctional compound is typically a low molecular weight material. Suitable examples include 1,1-dimethyl-m-isopropylbenzyl isocyanate (TMI), and isocyanatoethyl methacrylate (IEM). In TMI and IEM, the isocyanate groups are capable of reaction with any material containing an "active hydrogen", and their ethylenically unsaturated groups can undergo free radical polymerization. It has been found satisfactory to maintain the ratio of the bifunctional isocyanate compound to the polyether intermediate in the range of from about 0.5 to about 1.5 moles of the bifunctional isocyanate compound per mole of polyether intermediate, preferably 0.7 to about 1.1 mole per mole of polyether intermediate.

Conceptually, a wide variety of ethylenically unsaturated monomers may be utilized in the preparation of the polymer/polyol compositions in accordance with the invention. Numerous ethylenically unsaturated monomers are disclosed in the prior patents. Any of these monomers should be suitable.

The selection of the other monomer or monomers used in the mixture will depend on considerations such as the relative cost of the monomers and the polyurethane product characteristics required for the intended application. To impart the desired load-bearing to the foams, the monomer or monomers used in preparing the polymer/polyol should, of course, desirably be selected to provide a polymer which has a glass transition of at least slightly higher than room temperature. Exemplary monomers include styrene and its derivatives such as para-methylstyrene, acrylates, methacrylates such as methyl methacrylate, acrylonitrile and other nitrile derivatives such as methacrylonitrile, and the like. Vinylidene chloride may also be employed.

The preferred monomer mixtures used to make the polymer/polyol compositions of this invention are mixtures of acrylonitrile and styrene or acrylonitrile, styrene and vinylidene chloride.

As the amount of styrene or its derivatives in the monomer mixture is increased above about 70 weight percent or so, it becomes increasingly more difficult to make satisfactorily stable polymer/polyols. Additionally, at such high styrene levels, problems other than stability are also typically encountered. These problems include a decrease in conversion of the styrene monomer and the concomitant need to adequately strip the styrene monomer, as well as an increase in the viscosity of the polymer/polyol. Despite these drawbacks, levels of styrene greater than 75 weight percent and even as high as 100 weight percent may be desirable.

The monomer content will be typically selected to provide the desired solids content required for the anticipated end-use application. In general, it will usually be desirable to form the polymer/polyols with as high a resulting polymer or solids content as will provide the desired viscosity and stability properties. The present invention is highly desirable for preparing polymer/polyols having solids contents in excess of 25 or 30 percent by weight, based upon the weight of the polymer/polyol composition.

For molded foam applications, typically high resiliency formulations, solids content of up to about 45 weight percent or more are feasible and may be provided utilizing the present invention. In slabstock applications, the tendency is to utilize as high a solids content as possible, contents of 45 weight percent to about 50 weight percent or more being desired commercially for some applications.

As noted, the bifunctional compound is blended with the other ethylenically unsaturated monomer(s) forming a co- or termonomer mixture, the amine terminated polyether (or other suitable polyether intermediate) is blended with the base polyol and a free radical initiator, and these mixtures are fed to a heated reactor where the dispersion copolymerization occurs under controlled conditions. Most of the work with these blends has been done in a continuous reactor. However, the process is not limited to continuous operations, and can also be run in a batch or semi-batch mode.

Polymer/Polyol Preparation

The polymer/polyols of this invention are produced by polymerizing the monomer system used in the presence of a free radical catalyst in the polyol blend.

The polymer/polyols of the present invention are preferably prepared utilizing the process set forth in the previously identified Priest et al. patent. In accordance with that process, a low monomer-to-polyol ratio is maintained throughout the reaction mixture during the polymerization process. Such low ratios are achieved by employing process condition that provide rapid conversion of monomer to polymer. In practice, a low monomer-to-polyol ratio is maintained, in the case of semi-batch and continuous operation, by use of a free radical polymerization catalyst, by control of the temperature and mixing conditions and, in the case of semi-batch operation, by slowly adding the monomers to the polyol blend.

The mixing conditions employed are those attained using a back-mixed reactor (e.g., a stirred flask or stirred autoclave). Reactors of this type keep the reaction mixture relatively uniform and so prevent localized high monomer-to-polyol blend ratios. However, tubular reactors may be employed if they are modified so that increments of the monomer are added to various stages.

The utilization of the Priest et al. process is preferred since this allows the preparation of polymer/polyols with a wide range of monomer composition, polymer contents, and base polyol that could not be otherwise prepared with the necessary stability now often desired. However, whether the utilization of the Priest et al. process is essential depends upon whether the process parameters are such that a satisfactory polymer/polyol can be prepared without using this process.

Other processing technology is disclosed in the prior art and may likewise be used in the preparation of the polymer/polyols of the present invention. For example, the techniques set forth in U.S. Pat. No. 4,119,586 to Shah may be employed, if desired.

Control of residence time has been found useful in controlling both the degree of crosslinking (XLC) and the intrinsic viscosity of the polymer which, as mentioned in U S. Pat. No. 4,463,107, may be advantageous.

In a continuous operation, a stable dispersion of a polymer in a polyol is produced where the residence time, which is defined as that time calculated by dividing the reactor's volume by the volumetric flow rate of the total feed to the reactor, is from about 1 minute to about 5 hours, and preferably, from about 10 minutes to about 2 hours.

In a semi-batch operation where the reactor can be partially charged prior to initiating polymerization, the term residence time refers to that period of time during which significant polymerization of the monomer or co-monomers occurs. In semi-batch operation, residence times from about 30 minutes to about 10 hours are recommended.

Catalysts useful in producing the polymer/polyol compositions of this invention are the free radical-type, vinyl polymerization catalysts such as the peroxides, percarbonates, and the azo compounds. Any other suitable catalyst may be employed. Azo catalysts such as azobis (isobutyronitrile) are the preferred catalysts. 2,2-azobis (isobutyronitrile) is particularly preferred because it does not increase the acid number of the product, does not impart objectionable odor to the product, and does not require special handling, particularly as compared to certain peroxide catalysts.

The catalyst concentration can be varied within reasonably wide limits. The catalyst concentration will accordingly typically be adjusted to optimize the polymer/polyol properties. Accordingly, the concentration will generally be in the range of about 0.1 to about 3 weight percent based on the total feed to the reactor. The preferred amount of catalyst will be in the range of about 0.2 weight percent to about 1.0 weight percent. Up to a certain point, increases in the catalyst concentration result in increased monomer conversion but further increases do not substantially increase conversion. Conversions of monomers to polymers which can be typically achieved are on the order of 75% to 98% of the monomer charged. On the other hand, increasing catalyst concentration increasingly improves product stability. The catalyst concentration selected will usually be an optimum value considering all factors, including costs.

The temperature used in producing polymer/polyol compositions in accordance with the invention is not in itself critical and can be any temperature at which the selected catalyst has a reasonable rate of decomposition under the reaction conditions. Typically, in continuous processes, reaction temperatures of from about 100° C. to about 150° C. may be used, the preferred range being from about 100° C. to about 125° C. It has been found that with higher reaction temperatures there is a tendency for the intrinsic viscosity of the polymer to decrease. Accordingly, lower temperatures are preferred, typically in the range from about 105° C. to about 125° C.

Further, the addition of a polymer control agent during the polymerization reaction has been found to be useful. In general, as used herein, the terminology polymer control agent connotes a low molecular weight liquid which, upon use in preparing the polymer/polyol, results in polymer structure such that the polymer has low crosslinking coefficient and controlled intrinsic viscosity. Virtually any low molecular weight liquid should be suitable. A variety of low molecular weight carbon-hydrogen compounds are known and may be employed. The suitability of a particular liquid may be readily determined simply by employing the liquid in the polymer/polyol preparation. Accordingly, low molecular weight liquids may be employed regardless of whether any significant chain transfer activity is exhibited.

Low molecular weight liquids not conventionally viewed as chain transfer agents but useful as polymer control agents include water, cyclohexane, and benzene. Suitable polymer control agents which are conventionally viewed as chain transfer agents include ketones, alcohols, aldehydes, halogenated compounds, benzene derivatives and the like.

Any such known chain transfer agents can be utilized as the polymer control agents, if desired.

The polymer control agent or agents used should be added in an amount that will provide a polymer having the desired properties. Suitable levels will, of course, vary as discussed herein. Amounts up to 20 weight percent or higher, based on the total feed to the reactor, may be used satisfactorily. More typically, useful levels will be about 2 to 10 percent or so.

The viscosity of the polymer/polyol compositions can vary over a wide range, depending upon the limitations and requirements of the particular end use application. As a practical matter, it is generally desired to minimize the viscosity for obvious reasons. When the viscosity gets too high, it becomes difficult to handle the polymer/polyol, particularly in off-loading, mixing, and the like. In general, it is desired that the viscosity of the resulting polymer/polyol be less than about 10,000 cks at 25° C.

The viscosity of the resulting polymer/polyols will also typically vary depending upon the intended polyurethane application. In high resiliency molded foam applications where solids contents on the order of 25 to 45 weight percent or so are often used (typically diluted with conventional polyols in commercial formulations), the viscosities of the thus-diluted polymer/polyols will typically be in the 3500 to 5000 cks (25° C.) range or higher. In slabstock applications where solids contents of 35 to 60 percent by weight or more are desired and the polymer/polyols are sometimes used neat, the viscosity will typically be above about 3500 cks (25° C.) or so, often ranging up to 8000 cks (25° C.) or so.

Polymer/Polyol Stability

From the functional standpoint, suitable polymer/polyols must be capable of being: (1) made, (2) stored, (3) shipped, and (4) used without undue loss of polymer content or damage or fouling of the equipment in which it is made and handled. If a polymer/polyol meets these functional criteria, it is generally considered to be satisfactorily stable.

An indication of the stability can be provided by the filtration performance, which will be more fully discussed in conjunction with the working Examples. The filtration characteristics are determined by passing a sample of the polymer/polyol by gravity, through a 700-mesh wire screen. The most stable polymer/polyols will pass completely through the screen (i.e., over 99 weight percent).

Polyurethane Preparation

The present invention also provides a method for producing polyurethane products which include reacting: (a) a polymer/polyol composition of this invention, and (b) an organic polyisocyanate in the presence of (c) a catalyst for the reaction of (a) and (b) to produce the polyurethane product. When a foam is being prepared, the reaction is carried out in the presence of a blowing agent and a foam stabilizer. The reaction and foaming operations can be performed in any suitable manner, preferably by the one-shot technique.

The polymer/polyol may, if desired, be blended with conventional polyols or the like to reduce the polymer content to the level required for the particular end-use application. Blends in which the resulting polymer content is as low as 4 percent of the total weight of the blend, or even less, are useful.

The organic polyisocyanates that are useful in producing polyurethane products in accordance with this invention are organic compounds that contain at least two isocyanato groups. Such compounds are well-known in the art. Suitable organic polyisocyanates include the hydrocarbon diisocyanates (e.g., the alkylene diisocyanates and the arylene diisocyanates), as well as known triisocyanates and polymethylene poly (phenylene isocyanates). Examples of suitable polyisocyanates are 2,4-diisocyanatotoluene, 2,6 diisocyanatotoluene, methylene bis(4-cyclohexyl isocyanate), 1,2-diisocyanatoethane, 1,3 diisocyanatopropane, 1,2-diisocyanatopropane, 1,4-diisocyanatobutane, 1,5-diisocyanatopentane, 1,6 diisocyanatohexane, bis(3 isocyanatopropyl)ether, bis(3-isocyanatopropyl) sulfide, 1,7-diisocyanatoheptane, 1,5 diisocyanato 2,2-dimethylpentane, 1,6 diisocyanato-3-methoxyhexane, 1,8-diisocyanatooctane, 1,5 diisocyanato 2,2,4 trimethylpentane, 1,9 diisocyanatononane, 1,10 diisocyanatopropyl)ether of 1,4-butylene glycol, 1,11-diisocyanatoundecane, 1,12-diisocyanatododecane bis-(isocyanatohexyl) sulfide, 1,4-diisocyanatobenzene, 3,5 diisocyanato-o-xylene, 4,6-diisocyanato-m-xylene, 2,6-diisocyanato-p xylene, 2,4-diisocyanato 1 chlorobenzene, 2,4-diisocyanato 1-nitrobenzene, 2,5-diisocyanato-1-nitrobenzene, 4,4-diphenylmethylene diisocyanate (MDI), 2,4-diphenylmethylene diisocyanate, 3,3-diphenyl-methylene diisocyanate, and polymethylene poly (phenyleneisocyanates), and mixtures thereof. Also suitable are the liquid derivatives of MDI described in U.S. Pat. No. 3,394,164 and the various prepolymers or quasi prepolymers derived from either MDI or the liquid version of MDI upon reaction with hydroxyl or amine containing polyethers. The preferred polyisocyanate is about 80% of a mixture of 80% 2,4-tolylene diisocyanate and 20%, 2,6-tolylene diisocyanate and about 20% of a polymeric isocyanate.

Any known catalysts useful in producing polyurethanes may be employed. Representative catalysts include: (a) tertiary amines such as bis(2,2-dimethylamino)ethyl ether, trimethylamine, triethylamine, N-methylmorpholine, N ethylmorpholine, N,N-dimethylbenzylamine, N,N-dimethylethanolamine, N,N,N',N -tetramethyl-1,3-butanediamine, triethanolamine, 1,4-diazabicyclo-[2.2.2]octane, pyridine oxide and the like; (b) tertiary phosphines such as trialkylphosphines, dialkylbenzylphosphines, and the like; (c) strong bases such as alkali and alkaline earth metal hydroxides, alkoxides, and phenoxides; (d) acidic metal salts of strong acids such as ferric chloride, stannic chloride, stannous chloride, antimony trichloride, bismuth nitrate and chloride, and the like; (e) chelates of various metals such as those which can be obtained from acetylacetone, benzoylacetone, trifluoroacetylacetone, ethyl acetoacetate, salicylaldehyde, cyclopentanone-2-carboxylate, acetylacetoneimine, bis-acetylacetonealkylenediimines, salicylaldehydeimine, and the like, with the various metals such as Be, Mg, Zn, Cd, Pb, Ti, Zr, Sn, As, Bi, Cr, Mo, Mn, Fe, Co, Ni, or such ions as $MoO_2^{++}$, $UO_2^{++}$, and the like; (f) alcoholates and phenolates of various metals such as Ti(OR)$_4$, Sn(OR)$_4$, Sn(OR)$_2$, Al(OR)$_3$, and the like, wherein R is alkyl or aryl, and the reaction products of alcoholates with carboxylic acids, beta-diketones, and 2(N,N-dialkylamino)alkanols, such as the well known chelates of titanium obtained by said or equivalent procedures; (g) salts of organic acids with a variety of metals such as alkali metals, alkaline earth metals, Al, Sn, Pb, Mn, Co, Bi, and Cu, including, for example, sodium acetate, potassium laureate, calcium hexanoate, stannous acetate, stannous octoate, stannous oleate, lead octoate, metallic driers such as manganese and cobalt naphthenate, and the like; (h) organometallic derivatives of tetravalent tin, trivalent and pentavalent As, Sb, and Bi, and metal carbonyls of iron and cobalt.

Among the organotin compounds that deserve particular mention are dialkyltin salts of carboxylic acids, e.g., dibutyltin diacetate, dibutyltin dilaureate, dibutyltin maleate, dilauryltin diacetate, dioctyltin diacetate, dibutyltin-bis(4-methylaminobenzoate), dibutyltin bis(6-methylaminocaproate), and the like. Similarly, there may be used a trialkyltin hydroxide, dialkyltin oxide, dialkyltin dialkoxide, or dialkyltin dichloride. Examples of these compounds include trimethyltin hydroxide, tributyltin hydroxide, trioctyltin hydroxide, dibutyltin oxide, dioctyltin oxide, dilauryltin oxide, dibutyltin bis(isopropoxide) dibutyltin-bis(2-dimethylaminopentylate), dibutyltin dichloride, dioctyltin dichloride, and the like.

The tertiary amines may be used as primary catalysts for accelerating the reactive hydrogen/isocyanate reaction or as secondary catalysts in combination with one or more of the above noted metal catalysts. Metal catalysts, or combinations of metal catalysts, may also be employed as the accelerating agents, without the use of amines. The catalysts are employed in small amounts, for example, from about 0.001 percent to about 5 percent, based on the weight of the reaction mixture.

When the product to be formed is a polyurethane foam, a small amount of a blowing agent is employed in the reaction mixture. Suitable blowing agents, for example, include water from bout 0.5 to about 5 weight percent, based upon total weight of the polymer/polyol composition, or other suitable blowing agents which are vaporized by the exotherm of the reaction, or a combination of water and the other blowing agent. Illustrative polyurethane blowing agents include halogenated hydrocarbons such as trichloromonofluoromethane, dichlorodifluoromethane, dichloromonofluoromethane, dichloromethane, trichloromethane, 1,1-dichloro 1-fluoroethane, 1,1,2-trichloro-1,2,2-trifluoroethane, hexafluorocyclobutane, octafluorocyclobutane, and the like. Another class of blowing agents include thermally unstable compounds which liberate gases upon heating such as N,N'-dimethyl-N,N'-dinitrosoterephthalamide, amine formates, and the like. The generally preferred method of foaming for producing flexible foams is the use of water, or a combination of water plus a fluorocarbon blowing agent such as trichloromonofluoromethane. The quantity of blowing agent employed will vary with factors such as the density desired in the foamed product.

The scorch-free properties of the foams produced using polymer/polyol compositions are most evident when at least some of the blowing agent is water, and the water is used in an amount that results in a foam having a density less than 3.0 pounds per cubic foot. Generally, the use of water in an amount of about 2.0 percent by weight, based on the total weight of the polymer/polyol composition, results in a foam having a density of less than 3.0 pounds per cubic foot.

It is also within the scope of the invention to employ, when applicable, small amounts, e.g., about 0.001 percent to 5.0 percent by weight, based on the total reaction mixture, of a foam stabilizer. Suitable foam stabilizers or surfactants are known and may vary depending upon the particular polyurethane application. Suitable stabilizers for slabstock applications include "hydrolyzable" polysiloxane-polyoxyalkylene block copolymers such as the block copolymers described in U.S. Pat. Nos. 2,834,748 and 2,917,480. Another useful class of foam stabilizers are the "non-hydrolyzable" polysiloxane-polyoxyalkylene block copolymers such as the block copolymers described in U.S. Pat. Nos. 3,505,377 and 3,686,254 and British Patent Specification 1,220,471. The latter class of copolymers differs from the above-mentioned polysiloxane polyoxylakylene block copolymers in that the polysiloxane moiety is bonded to the polyoxy-alkylene moiety through direct carbon to silicon bonds, rather than through carbon-to-oxygen-to-silicon bonds. These various polysiloxane-polyoxyalkylene block copolymers preferably contain from 5 to 50 weight percent of polysiloxane polymer, with the remainder being polyoxyalkylene polymer. Yet another useful class of foam stabilizer is composed of the cyanoalkyl polysiloxanes described in U.S. Pat. No. 3,905,924.

The polyurethanes so produced may be utilized in foam and elastomer applications where any conventional type of polyurethane is or can be utilized. The polymer/polyol compositions of this invention find particular utility in the production of high resiliency foams for use in arm rests, mattresses, automobile seats, and the like, as well as in slabstock foams for use as carpet underlayment, and the like.

Whereas the exact scope of the instant invention is set forth in the appended claims, the following specific examples illustrate certain aspects of the present invention and, more particularly, point out methods of evaluating the same. However, the examples are set forth for illustration only and are not to be construed as limitations on the present invention except as set forth in the appended claims. All parts and percentages are by weight unless otherwise specified.

DEFINITIONS

As used in the Examples, the following designations, symbols, terms and abbreviation have the following meanings:

Polyol #1 - A polyoxyalkylene oxide polyol prepared from glycerine, propylene oxide (90%) and ethylene oxide (10%) where the ethylene oxide is present as an internal component of the polyol backbone. The polyol has an hydroxyl number of 52 mg KOH/g and contains essentially 100% secondary hydroxyl groups.

Polyol #2 - A polyoxyalkylene oxide polyol prepared from sorbitol, propylene oxide (90%) and ethylene oxide (10%) where the ethylene oxide is resent as an internal component of the polyol backbone. The polyol has an hydroxyl number of 28.2 mg KOH/g and a nominal molecular weight of about 11,900.

Polyol #3 - A polyoxyalkylene oxide polyol prepared from sorbitol, propylene oxide (84%) and ethylene oxide (16%) where the ethylene oxide is present as a cap. The polyol has an hydroxyl number of 28 mg KOH/g and a primary hydroxyl content of about 85% and a nominal molecular weight of about 12,000.

Polyol #4 - A commercial polymer polyol sold by Union Carbide as NIAX Polymer Polyol E-605.

Macromonomer #1 - Polyol #2 which has been allowed to react with maleic anhydride (enough to generate 0.1 meq/g unsaturation in the final product) followed by propylene oxide to an hydroxyl number of 27.5 mg KOH/g and a nominal molecular weight of about 12,200.

Macromonomer #2 ATP #1 (see below), 1002.9g, was placed in a reactor and heated to 70° C. TMI, 20.1g (0.1 mole) was then added rapidly with good stirring. After an additional hour at temperature, the adduct showed no residual isocyanate by IR analysis. Macromonomer #2 prepared in this manner had a viscosity of 3957 cks.

ATP - amine terminated polyether. ATP s #1 through #6 - All ATP s were prepared according to the following procedure: A mixture of Polyol #2, the appropriate amine and a supported nickel catalyst (Ni 5136P, Harshaw Filtrol Partnership) were charged to a high pressure stirred autoclave. The autoclave was pre-pressurized to about 100 psi with hydrogen, vented to remove air and then repressurized with hydrogen to a given pressure. The autoclave was heated to a preset temperature, held there for a given time, with stirring, and then cooled to room temperature. The catalyst was removed by filtration and the excess amine by vacuum stripping to yield the ATP. Details, including an analysis for each ATP are presented in Table A.

Polymer Polyol Preparation - All polymer polyols were prepared using a single stage 550 ml backmixed continuous reactor with a residence time of twenty minutes. The reactor was maintained at a specified temperature and at an internal pressure of about 45 psi during a reaction sequence. The comonomers were styrene and acrylonitrile at a ratio of 70/30 wt/wt. When used, the bireactive compound (eq. TMI) was added to this mixture, forming a termonomer mixture. The initiator was azo-bisisobutyronitrile used at a specified level (wt %) based on total charge of base polyol plus monomer. The initiator was added to the reactor as a solution in the base polyol mixture. The amine terminated polyether or other polyether intermediate was also added as part of the blend containing base polyol and initiator. The base polymer in which the polymerization was carried out was Polyol #1. In those controls where a premade macromonomer was used, it was added to the reactor as a solution in polyol #1. If polymer control agent(s) was used it was also added as a part of this solution.

In starting up most runs, a blend of Polyol #1 and Macromonomer #1 was placed in the reactor. To this was added the styrene/acrylonitrile mixture as indicated. When lined out, the feeds were switched to Polyol #1/ATP and Styrene/acrylonitrile/termonomer. This procedure minimized line out time and quantities of ATP required for each run. Subsequent work (see Example 9) confirmed that this combination start up was not required. Feed rates were established at about 630 g/hr (some runs were started at a slower feed rate, ca. 400 g/hr and gradually raised to the indicated maximum) and after a line out time of 120 minutes, material was collected. The material was then vacuum stripped to remove unreacted monomer and the product was analyzed. The details for the various runs are given in Tables 1 through 7.

EXAMPLES AND DISCUSSION

The actual efficacy of the various components can be evaluated by comparing the following parameters associated with the quality of polymer polyols: Viscosity, filterability through 150 and 700 mesh screens, amount of solids remaining in a tube after centrifugation and draining of a sample and average particle size of the dispersed polymer particles. Typical values of these parameters for several control polymer polyols made using conventional macromonomer are shown in Table 1. Examples A, B and C are polymer polyols made from the conventional process using, state-of-the-art high molecular weight, high functionality, maleate/fumarate based material (Macromonomer #1). These examples are presented for general comparison purposes. Example D illustrates intermediates normally used in the process of the present invention but actually used in the conventional sense via Macromonomer #2 to prepare a polymer polyol. Examples E and F show that when the amine terminated polyether is substituted with a polyether polyol having similar characteristsi, the resulting product is less desirable than the product utilizing the amine terminated polyether.

The utility of an amine terminated polyether in conjunction with a bireactive isocyanate compound to prepare polymer polyol via the process of the present invention is documented in the Examples shown in Tables 2 through 7.

TABLE A

AMINE TERMINATED POLYETHER DERIVATIVES FROM POLYOL #2

| ATP # | Amine | Amine/*** Polyol #2 | # CAT % | Initial H$_2$ Pressure, psi | Temp. °C. | Time, hr. | Total Amine | Product## %1° | %2° |
|---|---|---|---|---|---|---|---|---|---|
| 1 | IPA* | 10/1 | 2.2 | 200 | 220 | 4 | 0.41 | 78 | 22 |
| 2 | DIPA** | 10/1 | 2.2 | 275 | 195 | 20 | 0.38 | 18.7 | 81.3 |
| 3 | IPA | 3/1 | 2.2 | 286 | 195 | 6 | 0.26 | 58 | 42 |
| 4 | DIPA | 10/1 | 2.2 | 275 | 195 | 22 | 0.39 | 31 | 69 |
| 5 | DIPA | 3/1 | 2.2 | 271 | 195 | 2.2 | 0.23 | 30 | 70 |
| 6 | DIPA | 3/1 | 2.2 | 275 | 195 | 2 | 0.07 | 0 | 100 |

*IPA = isopropyl amine
**DIPA = diisopropyl amine
***Equivalents of amine/equivalents of polyol #2
Weight percent, total charge
Analysis after removal of catalyst and vacuum stripping

TABLE 1

| Base Polyol | Polyether Derivative | * Ratio | ** TMI/Der m/m | # Azo Initiator | Rx Temp. °C | ## PCA/% | Solids, % | Viscosity cks | Filtration, %(1) 150 | Filtration, %(1) 700 | CS(2) | PS(3) | Ex # |
|---|---|---|---|---|---|---|---|---|---|---|---|---|---|
| Control | Stab #1 | 90/10 | — | 0.6 | 125 | — | 40.0 | 5490 | 100 | — | 2.22 | 2.13 | A |
| Control | Stab #1 | 90/10 | — | 0.5 | 115 | THF/3 | 37.7 | 3898 | 100 | 79 | 5.8 | 1.77 | B |
| Control | Stab #1 | 90/10 | — | 0.5 | 115 | MeOH/IPA 3:2 | 45.0 | 48-5600 | 100 | 50-100 | 5.8-7.2 | 1.6-1.8 | C |
| Control | Stab #2 | 90/10 | 1.2 | 0.5 | 115 | IPA/5 | 45.1 | 10,392 | 100 | 15 | 9.3 | 1.74 | D |

TABLE 2

| Base Polyol | Polyether Derivative | Ratio | TMI/Der m/m | Azo Initiator | Rx Temp. °C | PCA/% | Solids, % | Viscosity cks | Filt. 150 | Filt. 700 | CS | PS | Ex # |
|---|---|---|---|---|---|---|---|---|---|---|---|---|---|
| Polyol #1 | ATP #6 | 90/10 | 1.2 | 0.5 | 115 | IPA/5 | 45.0 | 4893 | 100 | 10 | 26.7 | 4.62 | 1 |
| Polyol #1 | ATP #6 | 88/12 | 1.2 | 0.5 | 115 | IPA/5 | 45.0 | 4872 | 24 | 12 | 24.8 | 4.82 | 2 |

TABLE 3

| Base Polyol | Polyether Derivative | Ratio | TMI/Der m/m | Azo Initiator | Rx Temp. °C | PCA/% | Solids, % | Viscosity cks | Filt. 150 | Filt. 700 | CS | PS | Ex # |
|---|---|---|---|---|---|---|---|---|---|---|---|---|---|
| Polyol #1 | ATP #3 | 90/10 | 1.50 | 0.5 | 115 | IPA/5 | 45.0 | 7213 | 100 | 78 | 5.5 | 1.52 | 3 |
| Polyol #1 | ATP #3 | 90/10 | 1.20 | 0.5 | 115 | IPA/5 | 45.0 | 6095 | 100 | 100 | 6.9 | 2.02 | 4 |
| Polyol #1 | ATP #3 | 90/10 | 0.75 | 0.5 | 115 | IPA/5 | 45.0 | 5438 | 46 | 16 | 11.0 | 2.32 | 5 |
| Polyol #1 | ATP #3 | 90/10 | 0.45 | 0.5 | 115 | IPA/5 | 45.0 | 5350 | 100 | 90 | 16.0 | 2.78 | 6 |

* Weight ratio, base polyol/stabilizer or amine terminated polyether or polyether derivative
** Moles TMI/moles polyether derivative # Azobisisobutyronitrile
Polymer control agent; IPA — isopropyl alcohol THF — tetrahydrofuran MEAH — methyl alcohol
(1) Amount of material passing through 150 & 700 mesh screens after dilution with isopropyl alcohol.
(2) Centrifugable solids
(3) Particle size microns, as determined on Microtrac Equipment
(4) Polyol #1 and not Polymer Polyol #4 was placed in the reactor prior to start-up

TABLE 4

| Base Polyol | Polyether Derivative | * Ratio | ** TMI/Der m/m | # Azo Initiator | Rx Temp. °C | ## PCA/% | Solids, % | Viscosity cks | Filtration, %(1) 150 | Filtration, %(1) 700 | CS(2) | PS(3) | Ex # |
|---|---|---|---|---|---|---|---|---|---|---|---|---|---|
| Polyol #1 | ATP #5 | 90/10 | 1.50 | 0.5 | 115 | IPA/5 | 45.0 | 5128 | 100 | 59 | 5.9 | 1.72 | 7 |
| Polyol #1 | ATP #5 | 90/10 | 1.20 | 0.5 | 115 | IPA/5 | 45.0 | 5110 | 100 | 50 | 5.6 | 1.76 | 8 |
| Polyol #1 | ATP #5 | 90/1 | 1.20 | 0.5 | 115 | IPA/5 | 45.09 | 5544 | 100 | 25 | 6.8 | 1.76(4) | 9 |

TABLE 5

| Base Polyol | Polyether Derivative | Ratio | TMI/Der m/m | Azo Initiator | Rx Temp. °C | PCA/% | Solids, % | Viscosity cks | Filt. 150 | Filt. 700 | CS | PS | Ex # |
|---|---|---|---|---|---|---|---|---|---|---|---|---|---|
| Polyol #1 | ATP #1 | 90/10 | 1.0 | 0.5 | 115 | IPA/5 | 44.6 | 8934 | 100 | 100 | 7.7 | 1.94 | 10 |
| Polyol #1 | ATP #1 | 90/10 | 0.75 | 0.5 | 115 | IPA/5 | 45.2 | 7109 | 100 | 56 | 8.1 | 1.92 | 11 |
| Polyol #1 | ATP #1 | 90/10 | 0.45 | 0.5 | 115 | IPA/5 | 45.1 | 6131 | 100 | 69 | 11.0 | 2.25 | 12 |
| Polyol #1 | ATP #1 | 90/10 | 0.25 | 0.5 | 115 | IPA/5 | 45.1 | 6837 | 100 | 55 | 38 | 2.87 | 13 |
| Polyol #1 | ATP #1 | 92/8 | 0.75 | 0.5 | 115 | IPA/5 | 45.2 | 11110 | 100 | 20 | 41.3 | 2.17 | 14 |
| Polyol #1 | ATP #1 | 92/8 | 0.45 | 0.5 | 115 | IPA/5 | 45.2 | 7811 | 100 | 82 | 39.9 | 2.42 | 15 |
| Polyol #1 | ATP #1 | 92/8 | 0.25 | 0.5 | 115 | IPA/5 | 44.8 | 5468 | 100 | 26 | 44.4 | 3.19 | 16 |
| Polyol #1 | ATP #1 | 88/12 | 0.75 | 0.5 | 115 | IPA/5 | 45.3 | 10256 | 100 | 39 | 6.4 | 1.65 | 17 |
| Polyol #1 | ATP #1 | 88/12 | 0.45 | 0.5 | 115 | IPA/5 | 45.5 | 6575 | 100 | 80 | 9.3 | 2.08 | 18 |
| Polyol #1 | ATP #1 | 88/12 | 0.25 | 0.5 | 115 | IPA/5 | 45.5 | 7274 | 100 | 67 | 11.2 | 2.12 | 19 |
| Polyol #1 | ATP #1 | 90/10 | 1.0 | 0.6 | 125 | — | 40.0 | 9320 | 100 | — | 1.33 | 1.92 | 20 |

* Weight ratio, bas polyol/stabilizer or polyether derivative
** Moles TMI/moles polyether derivative
Azobisisobutyronitrile
Polymer control agent; IPA — isopropyl alcohol-tetrahydrofuron
(1) Amount of material passing through 150 & 700 mesh screens after deletion with isopropyl alcohol.
(2) Centrifugable solids (need definition) —
(3) Particle size microns, as determined on Microtrac Equipment
(4) Polyol #1 and not Polymer Polyol #4 was placed in the reactor prior to start-up

TABLE 6

| Base Polyol | Polyether Derivative | * Ratio | ** TMI/Der m/m | # Azo Initiator | Rx Temp. °C | ## PCA/% | Solids, % | Viscosity cks | Filtration, %(1) 150 | Filtration, %(1) 700 | CS(2) | PS(3) | Ex # |
|---|---|---|---|---|---|---|---|---|---|---|---|---|---|
| Polyol #1 | ATP #2 | 90/10 | 1.0 | 0.5 | 115 | THF/3 | 38.7 | 4550 | 100 | 50 | 5.8 | 1.6 | 21 |
| Polyol #1 | ATP #2 | 90/10 | 1.5 | 0.5 | 115 | IPA/5 | 45.0 | 5724 | 100 | 92 | — | 1.71 | 22 |
| Polyol #1 | ATP #2 | 90/10 | 1.2 | 0.5 | 115 | IPA/5 | 45.0 | 5362 | 100 | 100 | 6.0 | 1.81 | 23 |
| Polyol #1 | ATP #2 | 90/10 | 0.89 | 0.5 | 115 | IPA/5 | 45.3 | 5325 | 100 | 19 | 6.7 | 2.0 | 24 |
| Polyol #1 | ATP #2 | 90/10 | 0.45 | 0.5 | 115 | IPA/5 | 45.2 | 5356 | 100 | 15 | 11.0 | 2.6 | 25 |
| Polyol #1 | ATP #4 | 92/8 | 1.20 | 0.5 | 115 | IPA/5 | 45.3 | 7700 | 100 | 83 | 8.9 | 2.02 | 26 |
| Polyol #1 | ATP #4 | 92/8 | 1.50 | 0.5 | 115 | IPA/5 | 45.0 | 6718 | 100 | 24 | 5.3 | 1.66 | 27 |
| Polyol #1 | ATP #4 | 90/10 | 1.20 | 0.5 | 115 | IPA/5 | 45.0 | 9746 | 100 | 32 | 5.6 | 1.70 | 28 |

TABLE 7

| Polyol #1 | ATP #1 | 90/10 | 1.0 | 0.5 | 115 | THF/3 | 37.6 | 6002 | 100 | 98 | 6.1 | 1.63 | 29 |
|---|---|---|---|---|---|---|---|---|---|---|---|---|---|
| Polyol #1 | ATP #1 | 92/8 | 1.25 | 0.5 | 115 | THF/3 | 37.9 | 5752 | 100 | 46 | 5.9 | 1.60 | 30 |
| Polyol #1 | ATP #1 | 92/8 | 1.0 | 0.5 | 115 | IPA/3 | 37.6 | 5279 | 100 | 100 | 6.3 | 1.73 | 31 |
| Polyol #1 | Polyol #3 | 90/10 | 1.0 | 0.5 | 115 | THF/3 | 37.7 | 5522 | 45 | 2 | 25.9 | 3.74 | E |
| Polyol #1 | Polyol #3 | 90/10 | 1.2 | 0.5 | 115 | THF/3 | 37.6 | 5050 | 100 | 11 | 15.0 | 2.73 | F |

\* Weight ratio, base polyol/stabilizer or amine terminated polyether or polyether derivative
\*\* Moles TMI/moles polyether derivative
Azobisisobutyronitrile
Polymer control agent; IPA — isopropyl alcohol THF — tetrahydrofuran MEAH — methyl alcohol
(1) Amount of material passing through 150 & 700 mesh screens after dilution with isopropyl alcohol.
(2) Centrifugable solids
(3) Particle size microns, as determined on Microtrac Equipment
(4) Polyol #1 and not Polymer Polyol #4 was placed in the reactor prior to start-up

TABLE 8

FLEXIBLE URETHANE FOAM FORMULATION DATA

| Example # | 32 | 33 | 34 | 35 | 36 |
|---|---|---|---|---|---|
| Polyol #4 | 84.300* | | | | |
| Polyol #1 | 15.700 | 3.100 | | | |
| Polymer Polyol Ex 21 | | 96.900 | | | |
| Polymer Polyol Ex 33 | | | 100.000 | | |
| Polymer Polyol Ex B | | | | 100.000 | |
| Polymer Polyol Ex 29 | | | | | 100.00 |
| Water | 2.300 | 2.300 | 2.300 | 2.300 | 2.300 |
| A-1** | .050 | .050 | .050 | .050 | .050 |
| T-9*** | .125 | .125 | .125 | .125 | .125 |
| L-6202# | .700 | .700 | .700 | .700 | .700 |
| TDI | 29.940 | 29.770 | 29.740 | 29.770 | 29.740 |
| Index | 110.000 | 110.00 | 110.000 | 110.000 | 110.000 |
| Room Temp. | 72.000 | 72.000 | 72.000 | 72.000 | 72.000 |
| Poly Temp. | 85.000 | 85.000 | 85.000 | 85.000 | 85.000 |
| Humidity | 54.000 | 54.000 | 54.000 | 54.000 | 54.000 |
| Crem Time | 10.00 | 9.000 | 9.000 | 10.000 | 9.000 |
| Rise Time | 125.000 | 123.000 | 113.000 | 123.000 | 121.000 |
| Comments | | | SPLIT | | |
| Density | 2.400 | 2.370 | | 2.380 | 2.390 |
| Porosity | 37.380 | 31.990 | | 31.990 | 21.210 |
| IFD Thick | 4.070 | 4.090 | | 4.070 | 4.080 |
| IFD 25% | 101.500 | 101.750 | | 105.000 | 103.500 |
| IFD 65% | 211.250 | 212.250 | | 220.000 | 222.250 |
| IDF 25% RT | 69.000 | 69.000 | | 70.500 | 68.000 |
| Return Val | 67.980 | 67.810 | | 67.140 | 65.700 |
| IFD 65/25 | 2.080 | 2.090 | | 2.100 | 2.150 |
| CFD 25% | 1.240 | 1.310 | | 1.340 | 1.220 |
| CFD 65% | 2.310 | 2.410 | | 2.430 | 2.310 |
| Tensile | 31.410 | 28.300 | | 30.790 | 32.500 |
| Elongation | 133.560 | 125.730 | | 132.690 | 132.570 |
| Tear | 2.250 | 2.970 | | 2.440 | 3.080 |
| Comp 90% | 4.380 | 6.580 | | 5.250 | 6.580 |

\*All foams were made at identical solids content for accurate comparison. Targeted solids level was 37%
\*\*70% bis(dimethylaminoethyl)ether, 30% dipropylene glycol
\*\*\*Stannous octoate
A silicone surfactant sold commercially by Union Carbide

We claim:

1. A process for the preparation of a stable polymer polyol which comprises the in situ reaction of a monomer mixture in a polyol blend wherein at least one monomer of the monomer mixture is a bifunctional compound containing both an isocyanate group and an ethylenically unsaturated group and wherein the polyol blend comprises:
   (a) a base polyol and
   (b) an effective amount of an amine terminated polyether which is more reactive with the bifunctional compound than is the base polyol and which has a molecular weight approximately equal to or greater than the base polyol and wherein the ratio of the bifunctional compound the amine terminated polyether is in the range of from about 0.5 to about 1.5 moles of bifunctional compound per mole of amine terminated polyether).

2. The process of claim 1 wherein the bifunctional compound is 1,1-dimethyl m-isopropylbenzyl isocyanate.

3. The process of claim 1 wherein the bifunctional compound is isocyanatoethyl methacrylate.

4. The process of claim 1 wherein the other monomer of the monomer mixture is selected from the group consisting of styrene and its derivatives, acrylonitrile, methacrylonitrile, methyl methacrylate and vinylidene chloride.

5. The process of claim 1 wherein the base polyol is a glycerine started polyether polyol having predominantly secondary hydroxyl groups.

6. The process of claim 1 wherein the amine terminated polyether has a molecular weight equal to or greater than 6000.

7. The process of claim 5 wherein the amine terminated polyether is a glycerine started polyether having predominantly secondary amine groups.

8. The process of claim 1 wherein the amine terminated polyether is present in an amount from 1 to 25 weight percent based on the total weight of the polyol blend.

9. The process of claim 8 wherein the amine terminated polyether is present in an amount from 3 to 10 weight percent based on the total amount of the polyol blend.

10. The process of claim 1 wherein the monomer mixture is present in an amount to yield a polymer content in the resulting polymer polyol greater than 25 weight percent, based on the total weight of the polymer polyol.

11. A polymer polyol made according to the process of claim 1.

* * * * *